Nov. 13, 1951     B. O. SMITH     2,575,139
ARTIFICIAL BAIT
Filed Oct. 17, 1945
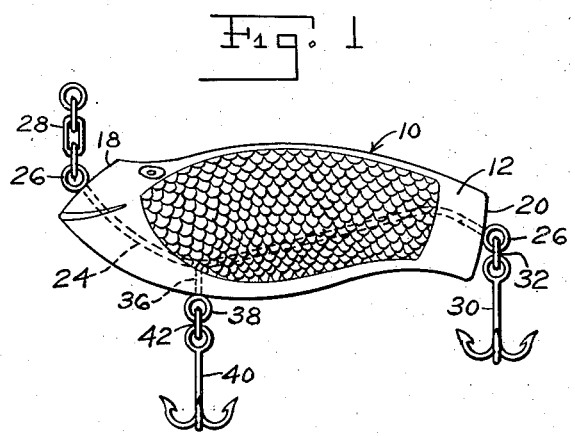
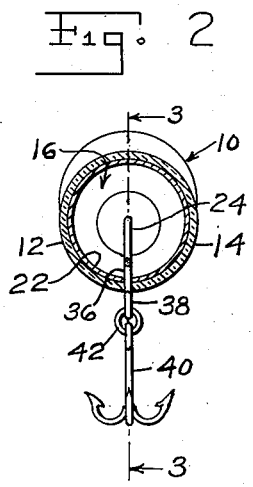
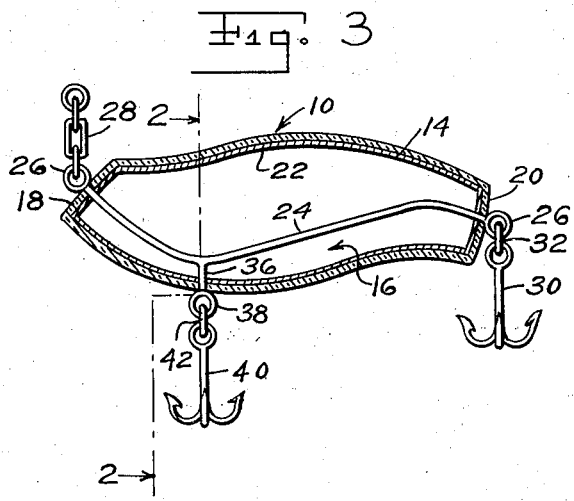
*INVENTOR.*
BENJAMIN O. SMITH
BY *Victor J. Evans & Co.*
ATTORNEYS Patented Nov. 13, 1951

2,575,139

UNITED STATES PATENT OFFICE 2,575,139

ARTIFICIAL BAIT

Benjamin O. Smith, St. Augustine, Fla.

Application October 17, 1945, Serial No. 622,873

1 Claim. (Cl. 43—42.33)

This invention relates to improvements in artificial bait or fish lures.

One object of the invention is to provide a hollow transparent lure having the inside thereof finished with an opaque coating simulating the scales and coloring of live fish.

Another object of the invention is to provide a lure which by its structure will protect and prolong the life of the coating applied thereto to simulate real fish.

Another object of the invention is to provide a lure from which the hooks cannot be easily removed during the use thereof, but with the proper tools can easily be replaced by hooks of various shapes and sizes.

With the above and other objects in view, the invention consists of certain novel details of construction and combinations of parts hereinafter more fully described and illustrated in the accompanying drawing and pointed out in the appended claims.

In the accompanying drawing forming part of this specification:

Figure 1 is a side elevation of an embodiment of the invention;

Figure 2 is a sectional view on the line 2—2 of Figure 3, and

Figure 3 is a sectional view on the line 3—3 of Figure 2.

Referring more in detail to the drawing, the numeral 10 generally designates the body of the line which is hollow and made of a moldable transparent material such as crystal clear opalex used with a liquid acetate, celluloid glass or other non-fragile materials which are transparent.

The shape of the lure can be made to suit the desires of the fisherman and the manufacturer, but as shown, the body 10 has concavo-convex bottom and top surfaces and circular side surfaces.

The body 10 is split at its longitudinal medial point to form two similar half sections 12 and 14, although the features of the present invention are applicable to a hollow body in which the sections are otherwise formed.

The sections thus formed when treated with a proper adhesive agent along the meeting edges will when pressed together form a coalescense therebetween, thereby integrally uniting the sections along the line of juncture, which affords a sealed chamber 16 on the interior of the body 10.

The body 10 is provided with slightly curved front and rear ends 18 and 20 respectively and the interior of the body is coated with an opaque coating 22.

Extending longitudinally of the body 10 within the chamber 16 is the hook attaching wire 24 which conforms somewhat to the contours of the chamber 16.

Each end of the wire 24 extends through openings in and then beyond the front and rear ends of the body 10 and is provided with eyes 26. The front eye 26 has chain links or a swivel 28 or the like attached thereto while the rear eye 26 has a hook 30 connected thereto by a split ring 32.

Depending from and secured to wire 34 and extending through an opening in the bottom of the body 10 is a wire 36, the end of which is provided with an eye 38 to which a hook 40 is connected by means of a split ring 42.

The wire 24 as formed and shown in Figure 3 gives better balance to the body 10 and the split rings which prevent the loss of the hooks 30 and 40 can be easily bent to replace the hooks when desired.

With the coating 22 on the interior of the body 10, the coating is protected from being washed off or bitten off by the fish and the coating will last longer and the attractiveness of the bait will last longer than if the coating were on the outside of the body 10.

There has thus been provided a fish lure that can be used for various types of fishing in both fresh and salt water.

A fisherman may have a number of differently colored lures depending on the fish he is attempting to catch and the lure while being visible to game fish has its life greatly prolonged by its structure.

While there has been shown and described an embodiment of the invention for the purpose of illustration, it is to be understood that the invention is not to be restricted specifically thereto, since changes and modifications thereof may be made without departing from the spirit of the invention or extending beyond the scope of the appended claim.

Having thus described the invention, what is claimed as new and desired to be secured by Letters Patent is:

A fish lure comprising a transparent hollow body formed of longitudinal similar halves secured along their edges to provide a sealed chamber, the top of said body being concave at its forward portion and merging into a convex rear portion, the bottom of said body being convex at its forward portion and merging into a concave rear portion, curved front and rear ends joining the top and bottom of said body, said front end facing upwardly, the interior of the body being coated with an opaque material, a first wire extending longitudinally through said chamber and through openings in the ends of said body, a second wire integral with said first wire and extending through an opening in the convex portion of said bottom, said body being circular in cross-section on a plane passing through said second wire, and eyes on the free ends of said wires abutting the lure body and providing line-attaching means for the front end and hook-attaching means for the bottom and rear end of said body.

BENJAMIN O. SMITH.

REFERENCES CITED

The following references are of record in the file of this patent:

UNITED STATES PATENTS

| Number | Name | Date |
|---|---|---|
| 632,554 | Dukes | Sept. 5, 1899 |
| 2,008,437 | DeWitt | July 16, 1935 |
| 2,017,903 | Johnson | Oct. 22, 1935 |
| 2,163,666 | Carter et al. | June 27, 1939 |
| 2,288,595 | Peterson | July 7, 1942 |

FOREIGN PATENTS

| Number | Country | Date |
|---|---|---|
| 21,411 | Great Britain | of 1909 |
| 393,514 | Great Britain | June 8, 1933 |